United States Patent
Khatami et al.

(10) Patent No.: US 11,692,750 B1
(45) Date of Patent: Jul. 4, 2023

(54) ELECTRONIC EXPANSION VALVE AND SUPERHEAT CONTROL IN AN HVAC SYSTEM

(71) Applicant: RENU, INC., Carrollton, TX (US)

(72) Inventors: Reza Khatami, Centerville, OH (US); Richard Zane DeLoach, Wentzville, MO (US)

(73) Assignee: RENU, INC., Carollton, TX (US)

( * ) Notice: Subject to any disclaimer, the term of this patent is extended or adjusted under 35 U.S.C. 154(b) by 131 days.

(21) Appl. No.: 17/021,804

(22) Filed: Sep. 15, 2020

(51) Int. Cl.
| | |
|---|---|
| *F25B 41/31* | (2021.01) |
| *F25B 39/02* | (2006.01) |
| *F25B 49/02* | (2006.01) |
| *F25B 41/20* | (2021.01) |
| *F25B 41/34* | (2021.01) |

(52) U.S. Cl.
CPC ............ *F25B 41/31* (2021.01); *F25B 39/02* (2013.01); *F25B 41/20* (2021.01); *F25B 49/02* (2013.01); *F25B 41/34* (2021.01); *F25B 2341/063* (2013.01); *F25B 2500/26* (2013.01); *F25B 2600/2513* (2013.01); *F25B 2700/171* (2013.01); *F25B 2700/197* (2013.01); *F25B 2700/21175* (2013.01)

(58) Field of Classification Search
CPC .......... F25B 41/31; F25B 39/02; F25B 41/20; F25B 49/02; F25B 41/34; F25B 2341/063; F25B 2500/26; F25B 2600/2513; F25B 2700/171; F25B 2700/197; F25B 2700/21175
See application file for complete search history.

(56) References Cited

U.S. PATENT DOCUMENTS

| | | |
|---|---|---|
| 2,612,095 A | 9/1952 | Kennedy |
| 2,658,440 A | 11/1953 | Lange |
| 3,063,357 A | 11/1962 | Eberhart |
| 3,623,419 A | 11/1971 | Taylor |
| 3,703,141 A | 11/1972 | Pernoud |
| 3,877,356 A | 4/1975 | Bruns |
| 5,115,616 A | 5/1992 | Nixon |
| 5,301,744 A | 4/1994 | Derks |

(Continued)

FOREIGN PATENT DOCUMENTS

| | | | | |
|---|---|---|---|---|
| CN | 108369039 B | * | 7/2020 | .............. F25B 13/00 |
| JP | 3608500 B2 | * | 1/2005 | ......... B60H 1/00814 |

(Continued)

*Primary Examiner* — Kun Kai Ma
(74) *Attorney, Agent, or Firm* — Haverstock & Owens, A Law Corporation

(57) ABSTRACT

An EXV (electronic expansion valve) control system includes an EXV controller for controlling an EXV within the refrigerant loop of an HVAC system. The EXV controller implements a master control algorithm that includes a plurality of sub-control algorithms and an initial series of branching decision points to determine the current mode of operation and to execute select sub-control algorithms corresponding to the current mode of operation, while not executing the sub-control algorithms corresponding to the other modes of operation. The sub-control algorithms implement various combinations of PID (Proportional Integral Derivative) control and feed-forward control, the results of which can be mapped to specific control instructions for the EXV.

25 Claims, 8 Drawing Sheets

(56) References Cited

U.S. PATENT DOCUMENTS

| | | | |
|---|---|---|---|
| 5,396,779 A * | 3/1995 | Voss | B60H 1/00792 |
| | | | 62/196.2 |
| 6,574,975 B2 | 6/2003 | Bourne et al. | |
| 6,701,741 B2 | 3/2004 | Liu | |
| 9,011,216 B1 | 4/2015 | Al-Alusi | |
| 9,086,226 B2 | 7/2015 | Bauer | |
| 9,519,874 B2 | 12/2016 | Macek | |
| 9,772,116 B2 | 9/2017 | Hester | |
| 9,869,484 B2 | 1/2018 | Hester et al. | |
| 9,933,177 B2 | 4/2018 | Hester et al. | |
| 10,094,586 B2 | 10/2018 | Pavlovski | |
| 10,136,549 B2 | 11/2018 | Steiner | |
| 10,571,414 B2 | 2/2020 | Turner | |
| 10,708,077 B2 | 7/2020 | Cui | |
| 11,098,921 B2 | 8/2021 | Ellis | |
| 11,143,423 B2 | 10/2021 | Li | |
| 11,156,572 B2 | 10/2021 | Buda | |
| 2006/0099904 A1 | 5/2006 | Belt | |
| 2007/0138307 A1 | 6/2007 | Khoo | |
| 2010/0262298 A1 | 10/2010 | Johnson | |
| 2012/0259469 A1 | 10/2012 | Ward | |
| 2013/0173064 A1 | 7/2013 | Fadell | |
| 2014/0087158 A1 | 3/2014 | Ciuperca | |
| 2014/0249876 A1 | 9/2014 | Wu | |
| 2014/0260034 A1 | 9/2014 | Ciuperca | |
| 2015/0204600 A1 | 7/2015 | Fay | |
| 2016/0123619 A1 | 5/2016 | Hester | |
| 2016/0201933 A1 | 7/2016 | Hester | |
| 2016/0201934 A1 | 7/2016 | Hester | |
| 2016/0223214 A1 | 8/2016 | Turner | |
| 2016/0223216 A1 | 8/2016 | Buda | |
| 2016/0305678 A1 | 10/2016 | Pavlovski | |
| 2017/0003039 A1 | 1/2017 | Lazzari | |
| 2017/0074534 A1 | 3/2017 | Turner | |
| 2017/0146261 A1 | 5/2017 | Rogers et al. | |
| 2018/0004172 A1 | 1/2018 | Patel | |
| 2018/0202678 A1 | 7/2018 | Ahuja | |
| 2018/0206414 A1 | 7/2018 | Goodman | |
| 2018/0335220 A1 | 11/2018 | Matambo | |
| 2019/0078801 A1 | 3/2019 | Turney et al. | |
| 2019/0103182 A1 | 4/2019 | Borshch | |
| 2019/0158305 A1 | 5/2019 | Cui | |
| 2019/0309975 A1 | 10/2019 | Salem | |
| 2019/0338974 A1 | 11/2019 | Turney | |
| 2019/0338975 A1 | 11/2019 | Ray | |
| 2019/0353378 A1 | 11/2019 | Ramamurti | |
| 2019/0353384 A1 | 11/2019 | Laughman | |
| 2019/0360711 A1 | 11/2019 | Sohn | |
| 2020/0088427 A1 | 3/2020 | Li | |
| 2020/0256581 A1 | 8/2020 | Wang | |
| 2020/0355391 A1 | 11/2020 | Wenzel | |
| 2021/0011443 A1 | 1/2021 | McNamara | |
| 2021/0018205 A1 | 1/2021 | Ellis | |
| 2021/0018211 A1 | 1/2021 | Ellis | |
| 2021/0025617 A1 | 1/2021 | Hamada | |
| 2021/0055011 A1 | 2/2021 | Smith | |
| 2021/0102722 A1 | 4/2021 | Nabi | |
| 2021/0140660 A1 | 5/2021 | Kogo | |
| 2021/0140671 A1 | 5/2021 | Francis | |
| 2021/0173366 A1 | 6/2021 | Turney | |
| 2021/0191348 A1 | 6/2021 | Lee | |
| 2021/0270487 A1 | 9/2021 | Salem | |
| 2021/0285671 A1 | 9/2021 | Du | |
| 2021/0325072 A1 | 10/2021 | Lin | |
| 2021/0364181 A1 | 11/2021 | Risbeck | |

FOREIGN PATENT DOCUMENTS

| | | | | |
|---|---|---|---|---|
| JP | 3686195 B2 * | 8/2005 | | |
| JP | 2008215807 A * | 9/2008 | | F25B 49/005 |
| JP | 2015094558 A * | 5/2015 | | F25B 49/02 |
| JP | 2019113214 A * | 7/2019 | | |

\* cited by examiner

ELECTRONIC EXPANSION VALVE AND SUPERHEAT CONTROL IN AN HVAC SYSTEM

FIELD OF THE INVENTION

The present invention is generally directed to an HVAC (Heating, Ventilating, and Air Conditioning) system. More specifically, the present invention is directed to control systems and algorithms for controlling an HVAC system.

BACKGROUND OF THE INVENTION

An HVAC system typically includes an evaporator coil, a condenser, an accumulator, a condensor, and a metering device. The components are interconnected by pipes or tubing, and separate fans move air across the evaporator coil and the condenser. A refrigerant is in various phases as it flows through the air conditioning components. Circulating refrigerant vapor enters the compressor and is compressed to a higher pressure, resulting in a higher temperature as well. The compressed refrigerant vapor is now at a temperature and pressure at which it can be condensed and is routed through the condenser. In the condenser, the compressed refrigerant vapor flows through condenser coils. A condenser fan blows air across the condenser coils thereby transferring heat from the compressed refrigerant vapor to the flowing air. Cooling the compressed refrigerant vapor condenses the vapor into a liquid. The condensed refrigerant liquid is output from the condenser to the accumulator where the condensed refrigerant liquid is pressurized. The condensed and pressurized refrigerant liquid is output from the accumulator and routed through the metering device where it undergoes an abrupt reduction in pressure. That pressure reduction results in flash evaporation of a part of the liquid refrigerant, lowering its temperature. The cold refrigerant liquid/vapor is then routed through the evaporator coil. The result is a mixture of liquid and vapor at a lower temperature and pressure. The cold refrigerant liquid-vapor mixture flows through the evaporator coil and is completely vaporized by cooling the surface of the evaporator coil and cooling air moving across the evaporator coil surface. The resulting refrigerant vapor returns to the compressor to complete the cycle.

A primary function of the metering device is to regulate the amount of refrigerant released into the evaporator thereby keeping superheat at a superheat set point value, ensuring that the only phase in which the refrigerant leaves the evaporator is vapor, and, at the same time, supplying the evaporator coils with the optimal amount of liquid refrigerant to achieve the optimal heat exchange rate allowed by that evaporator. Superheating is the energy added to saturated gas, resulting in a temperature increase. During the evaporation of a liquid refrigerant, the temperature depends only on the boiling temperature of that refrigerant. Increasing the temperature (superheating) is possible only after obtaining 100% vapor. Once the refrigerant has boiled to a vapor then any temperature above and beyond the boiling point is known as the superheat. In other words, superheat is any temperature of a gas that is above the boiling point for that liquid. In general, superheat (temperature) is calculated as the difference between the measured temperature (output from the evaporator) and the current saturation temperature, where the current saturation temperature is calculated according to the measured pressure (output from the evaporator). Superheat provides a measure as to whether or not the correct amount of refrigerant is being fed into the evaporator. If the superheat is too high, then not enough refrigerant is being fed in. This can result in poor system performance and loss of energy efficiency. However, if the superheat is too low, then there is a surplus of refrigerant being fed into the evaporator. This result can be a sign that liquid refrigerant is entering into the compressor. Liquid refrigerant inside a compressor can mix with oil at the bottom of the compressor casing. This can result in poor lubrication to the compressor and may result in premature failure.

The metering device includes an expansion valve, which regulates the amount of refrigerant released into the evaporator. One type of expansion valve is a thermal expansion valve, often abbreviated as TEV, TXV, or TX valve. The TXV is configured to maintain a stable level of superheating inside the evaporator under all conditions by adjusting the mass flow of refrigerant in response to the evaporator load. Flow control, or metering, of the refrigerant is accomplished by use of a temperature sensing bulb that causes an orifice in the valve to open or close depending on a temperature of the refrigerant. TXVs are popular due to their simplicity and availability, and their relatively good sensitivity and accuracy in regulation. The large choice of expansion valve sizes and bulbs means the capacity and temperature ranges are very good. A disadvantage of TXVs is the necessity for relatively high superheating, which negatively effects the evaporation process.

Another type of expansion valve is an electronic expansion valve (EXV). An EXV is generally considered an improvement over the TXV. EXVs are more sophisticated and allow the HVAC system to operate more accurately and efficiently than TXVs. EXVs include a stepper motor coupled to a valve head. Step-wise action of the stepper motor enables opening or closing of the valve according to control instructions received by the stepper motor from an EXV controller. Benefits to using an EXV include precise control, fast, and accurate response to load change, wider part load variation than a TXV, maintains maximum capacity control even at part loads, and more accurately injects the right amount of refrigerant, which all contribute to improved performance and reduced energy consumption for the HVAC system.

SUMMARY OF THE INVENTION

Embodiments are directed to an EXV control system including an EXV controller for controlling an EXV within the refrigerant loop of an HVAC system. The EXV controller implements a master control algorithm that includes a plurality of sub-control algorithms and an initial series of branching decision points to determine the current mode of operation and to execute select sub-control algorithms corresponding to the current mode of operation, while not executing the sub-control algorithms corresponding to the other modes of operation. The sub-control algorithms implement various combinations of PID (Proportional Integral Derivative) control and feed-forward control, the results of which can be mapped to specific control instructions for the EXV.

In an aspect, an HVAC system is disclosed that includes a refrigerant loop, a compressor, an evaporator, an electronic expansion valve, and a controller. The refrigerant loop includes a refrigerant flowing within. The compressor is coupled to the refrigerant loop, and the evaporator is coupled to the refrigerant loop. The electronic expansion valve is coupled to the refrigeration loop to regulate a mass flow of the refrigerant into the evaporator. The controller is coupled to the compressor and the electronic expansion valve. The controller is configured to receive data signals corresponding to one or more compressor characteristics. The controller includes and is configured to execute a master control algorithm to generate control signals for controlling the electronic expansion valve. The master control algorithm comprises a plurality of sub-control algorithms and an up-front evaluation algorithm, each of the plurality of sub-control algorithms is configured to determine a step adjustment of the electronic control valve. The master control algorithm executes the up-front evaluation algorithm to determine a current operating mode according to the received compressor characteristics and then selectively executes a subset of the plurality of sub-control algorithms depending on the determined current operating mode. In some embodiments, the HVAC system further comprises an external temperature sensor coupled to the controller and configured to sense a temperature external to the HVAC system. In some embodiments, the controller is further configured to perform a feed-forward control by mapping the measured compressor characteristics and the sensed external temperature to a corresponding open position of the electronic expansion valve. In some embodiments, the controller is further configured to receive data signals corresponding to a pressure value at an output of the evaporator and a temperature value at the output of the evaporator. In some embodiments, the controller is further configured to perform a PID (Proportional Integral Derivative) control using the received pressure value and the received temperature value to adjust the open position of the electronic expansion valve. In some embodiments, the master control algorithm is configured to selectively execute the plurality of sub-control algorithms depending on the determined current operating mode while bypassing remaining sub-control algorithms corresponding to non-determined current modes of operation. In some embodiments, the current operating mode is one of a start-up mode, a compressor rps change mode, and a load change mode. In some embodiments, the up-front evaluation algorithm is configured to determine if the compressor is on, and then determine if the compressor is at start-up, which corresponds to the start-up mode, and then determine if there is a compressor rps change, which corresponds to the compressor rps change mode, and if the compressor is on but neither the compressor is in start-up nor is there compressor rps change then it is determined that the current operating mode is the load change mode.

In another aspect, another HVAC system is disclosed that includes a refrigerant loop, a compressor, an evaporator, an electronic expansion valve, and a controller. The refrigerant loop includes a refrigerant flowing within. The compressor is coupled to the refrigerant loop, and the evaporator is coupled to the refrigerant loop. The electronic expansion valve is coupled to the refrigeration loop to regulate a mass flow of the refrigerant into the evaporator. The controller is coupled to the compressor and the electronic expansion valve. The controller is configured to receive data signals corresponding to one or more compressor characteristics. The controller includes and is configured to execute a master control algorithm to generate control signals for controlling the electronic expansion valve. The master control algorithm includes a feed-forward sub-control algorithm that generates a step adjustment of the electronic control valve based on the one or more compressor characteristics to proactively adjust the electronic control valve. In some embodiments, the HVAC system further comprises a temperature sensor for sensing an external temperature, and the data signals received by the controller further include an external temperature value. In some embodiments, the feed-forward sub-control algorithm generates the step adjustment based on the one or more compressor characteristics and the external temperature value. In some embodiments, the master control algorithm comprises a plurality of sub-control algorithms, the feed-forward sub-control algorithm is one of the plurality of sub-control algorithms. In some embodiments, the master control algorithm is configured to selectively execute a subset of the plurality of sub-control algorithms depending on a determined current operating mode, further wherein the current operating mode is determined according to the compressor characteristics. In some embodiments, the current operating mode is one of a start-up mode, a compressor rps change mode, and a load change mode. In some embodiments, the subset of the plurality of sub-control algorithms corresponding to the start-up mode includes a first feed-forward control algorithm, a first PID (Proportional Integral Derivative) control algorithm, and a second PID control algorithm. In some embodiments, the master control algorithm is configured to execute the first feed-forward control algorithm to provide a coarse-tuned first electronic expansion valve step adjustment, then to execute the first PID control algorithm to provide a fine-tuned second electronic expansion valve step adjustment, and then to execute the second PID control algorithm to provide a fine-tuned third electronic expansion valve step adjustment. In some embodiments, the first PID control algorithm applies first gain factor values and the second PID control algorithm applies second gain factor values different from the first gain factor values. In some embodiments, the subset of the plurality of sub-control algorithms corresponding to the compressor rps change mode includes a second feed-forward control algorithm, a third PID control algorithm, and the second PID control algorithm. In some embodiments, the master control algorithm is configured to execute the second feed-forward control algorithm to provide a coarse-tuned first electronic expansion valve step adjustment, then to execute the third PID control algorithm to provide a fine-tuned second electronic expansion valve step adjustment, and then to execute the second PID control algorithm to provide a fine-tuned third electronic expansion valve step adjustment. In some embodiments, the second PID control algorithm applies second gain factor values and the third PID control algorithm applies third gain factor values different from the second gain factor values. In some embodiments, the subset of the plurality of sub-control algorithms corresponding to the load change mode includes a fourth PID control algorithm and the second PID control algorithm. In some embodiments, the master control algorithm is configured to execute the fourth PID control algorithm to provide a fine-tuned first electronic expansion valve step adjustment and then to execute the second PID control algorithm to provide a fine-tuned second electronic expansion valve step adjustment. In some embodiments, the data signals received by the controller further include a pressure value at an output of the evaporator and a temperature value at the output of the evaporator. In some embodiments, the controller is further configured to execute a PID control algorithm using the received pressure value and the received temperature value to adjust the electronic expansion valve. In some embodiments, the master control algorithm is configured to first execute the feed-forward control algorithm followed by the PID control algorithm.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Figure 1:
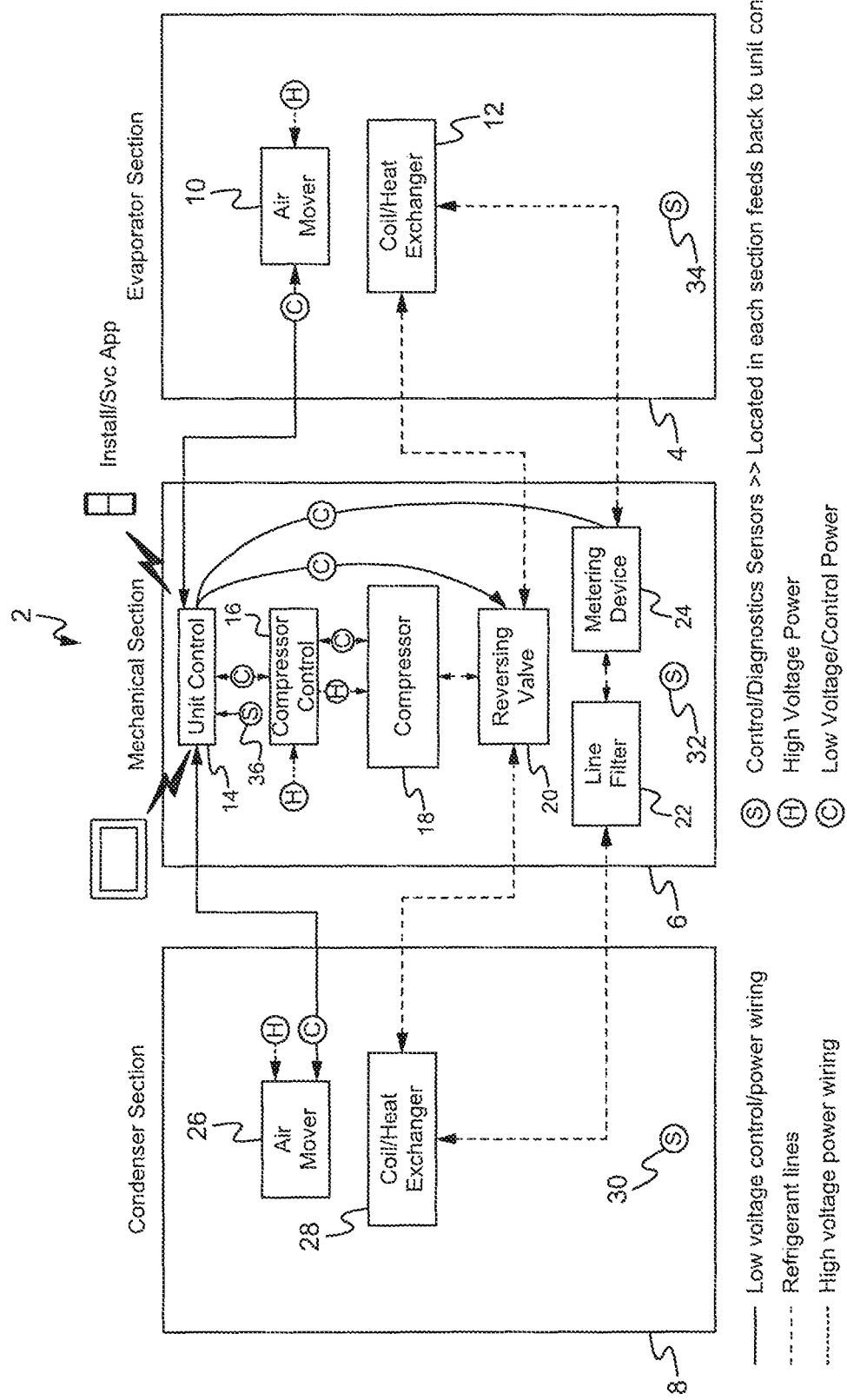
FIG. 1 illustrates a schematic block diagram of the HVAC unit and constituent components corresponding to air conditioning functionality according to some embodiments.

Embodiments of the present application are directed to an EXV control system used in an HVAC system. Those of ordinary skill in the art will realize that the following detailed description of the EXV control system is illustrative only and is not intended to be in any way limiting. Other embodiments of the EXV control system will readily suggest themselves to such skilled persons having the benefit of this disclosure.

Reference will now be made in detail to implementations of the EXV control system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In some embodiments, an HVAC system includes three sub-assemblies: an indoor air cycling section, a mechanical section, and an outdoor air cycling section. The indoor air cycling section, or simply "indoor section", cycles air from an interior area of a unit (e.g. indoors) and back out to the interior area. The outdoor air cycling section, or simply "outdoor section", cycles air from an area exterior to the unit (e.g. outdoors) and back out to the exterior area. The indoor section, the mechanical section, and the outdoor section can be integrated within a single device, e.g. an HVAC system, or can be separated as one, two, or three discrete modules coupled together. For example, in a split HVAC system there are two modules, one module includes the indoor section and the other module includes the outdoor section and the mechanical section. In an application where air conditioning cooling is performed, the indoor section functions as an evaporator section, and the outdoor section functions as a condenser section. It is understood that the HVAC system also can be used for heating, in which case the functionality of the indoor section and the outdoor section can be reversed from that described regarding an evaporator section and a condenser section. Subsequent discussion may be directed to air conditioning cooling and therefore reference is made in those occurrences to an evaporator section having an evaporator coil and a condenser section having a condenser coil. It is understood that such description can be generally applied to an indoor section and an outdoor section that performs a heating function.

The evaporator section includes a heat exchanger, an air mover, and electrical circuitry. In some embodiments, the heat exchanger includes an evaporator coil and interconnecting refrigerant tubing. In some embodiments, the air mover includes a motor and a fan, generally referred to as an indoor fan, i.e. a fan for the indoor section. In some embodiments, the electrical circuitry includes power wiring, control wiring, and control/diagnostic sensors. The mechanical section includes refrigerant loop components, in-line components, and electrical circuitry including HVAC system control. In some embodiments, the refrigerant loop components include a compressor and a metering device, such as an electronic expansion valve. In some embodiments, the in-line components include one or more valves, one or more filters, and interconnecting refrigerant tubing. In some embodiments, the electrical circuitry of the mechanical section includes HVAC system controls, electrical components, power wiring, control wiring, and control/diagnostics sensors. The condenser section includes a heat exchanger, an air mover, an auxiliary heating component, air quality components, and electrical circuitry. In some embodiments, the heat exchanger of the condenser section includes a condenser coil and interconnecting refrigerant tubing. The condenser section can also include an accumulator. In some embodiments, the air mover in the condenser section includes a motor and a fan generally referred to as an outdoor fan, i.e. a fan for the outdoor section. In some embodiments, the auxiliary heating component includes one or more resistive heating elements. In some embodiments, the air quality components include an air filter and ventilation components. In the some embodiments, the electrical circuitry of the condenser section includes power wiring, control wiring, and control/diagnostic sensors.

FIG. 1 illustrates a schematic block diagram of an HVAC system 2 and constituent components corresponding to air conditioning functionality according to some embodiments. The HVAC system 2 includes an evaporator section 4, a mechanical section 6, and a condenser section 8. A heat exchanger 12 including an evaporator coil in the evaporator section 4 is coupled to a compressor 18 via interconnecting refrigerant tubing and one or more valves 20. The compressor 18 is coupled to a heat exchanger 28 including a condenser coil in the condenser section 8 via interconnecting refrigerant tubing and the one or more valves 20. The heat exchanger 28 also can include an accumulator (not shown) that is coupled to the condenser coil via interconnecting refrigerant tubing. The heat exchanger 28 is coupled to a metering device 24 via interconnecting refrigerant tubing, one or more valves, and filters 22. The metering device 24 is coupled to the heat exchanger 12 via interconnecting refrigerant tubing. In this manner a refrigerant loop is formed, where the refrigerant loop includes the evaporator coil in the heat exchanger 12, the compressor 18, the condenser coil and the accumulator in the heat exchanger 28, the metering device 24, and the interconnecting pipes, valves, and filters. It is understood that the number and configuration of interconnecting refrigerant tubing, valves, and filters shown in FIG. 1 is for exemplary purposes only and that alternative configurations are also contemplated for interconnecting the heat exchanger 12, the compressor 18, the heat exchanger 28, and the metering device 24. It is also understood that the direction of refrigerant flow can be one direction for cooling functionality (air conditioning) and the other direction for heating functionality.

An air mover 10 in the evaporator section 4 is coupled to the heat exchanger 12 to blow air over the evaporator coil, and an air mover 26 in the condenser section 8 is coupled to the heat exchanger 28 to blow air over the condenser coil. A compressor controller 16 is coupled to the compressor 18. In some embodiments, the compressor controller 16 includes programmable logic circuitry and memory for executing control algorithms used to control operation of the compressor 18. In some embodiments, the compressor 18 is a variable speed compressor that can be selectively controlled to operate at multiple different speeds (rpm). An HVAC unit controller 14 is coupled to the air mover 10, the compressor controller 16, the one or more valves such as valves 20, the metering device 24, and the air mover 26. In some embodiments, the HVAC unit controller 14 includes programmable logic circuitry and memory for executing control algorithms used to control operation of the HVAC system 2 and corresponding components. Control signaling, indicated by "C" in FIG. 1, is transmitted between the compressor controller 16 and the compressor 18, and between the HVAC unit controller 14 and the air mover 10, the compressor controller 16, the one or more valves such as valves 20, the metering device 24, and the air mover 26. In some embodiments, the compressor controller 16 can be integrated as part of the HVAC unit controller 14. Control/diagnostic sensors 30, 32, 34, 36 can be used to sense various ambient conditions, such as temperature or humidity, which are connected back to the HVAC unit controller 14 and can be used to control the various components of the HVAC system 2. High voltage power, such as 120 VAC, is supplied to each of the air mover 10, the compressor controller 16, and the air mover 26. High voltage power can be supplied from the compressor controller 16 to the compressor 18. High voltage power input is indicated by "H" in FIG. 1. Low voltage power is supplied to the unit controller 14. Low voltage power can be provided via wiring labeled "C". It is understood that alternative power supply configurations are also contemplated.

The HVAC unit controller 14 is connected to a human-machine interface (HMI), also referred to as a user interface, that can be installed on a front side of the HVAC system. User interface with the HVAC unit controller 14 also can be made using an installation/service application included on a mobile device. The HVAC unit controller 14 is also externally connected via a network connection, either wired or wireless.

In some embodiments, air filters are included as part of the evaporator section 4 and the condenser section 8. Air is drawn into the evaporator section 4, such as from the unit in which the HVAC unit is installed, directed across the evaporator coil, and output from the evaporator section 4 back into the unit. The air filter can be positioned at an air intake portion of the evaporator section 4 such that air is filtered prior to being blown across the evaporator coil. Similarly, air is drawn into the condenser section 8, such as from outside the unit within which the HVAC unit is installed, directed across the condenser coil, and output from the condenser section 8 back outside the unit. The air filter can be positioned at an air intake portion of the condenser section 8 such that air is filtered prior to being blown across the condenser coil.

The evaporator section, the mechanical section, and the condenser section are described above as each having specific components. It is understood that this is for exemplary purposes only and that one or more components may be positioned in different sections of the HVAC unit.

Figure 2:
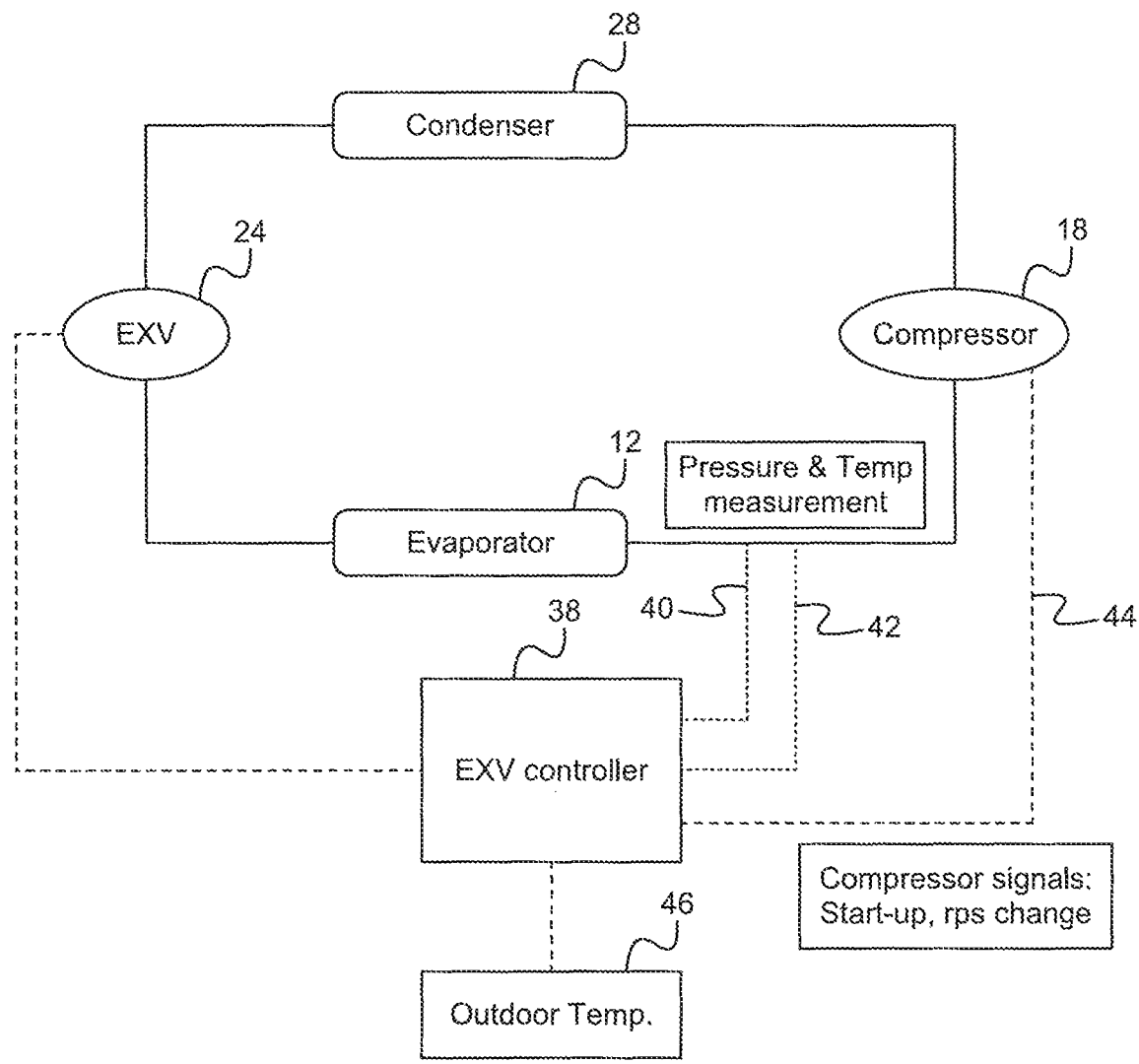
FIG. 2 illustrates a simplified block diagram of the HVAC system of FIG. 1 according to some embodiments.

FIG. 2 illustrates a simplified block diagram of the HVAC system of FIG. 1 according to some embodiments. In particular, FIG. 2 shows the refrigerant loop including the evaporator coil in the heat exchanger 12, the compressor 18, the condenser coil and the accumulator in the heat exchanger 18, the metering device 24, and the interconnecting pipes. In some embodiments, the metering device 24 is implemented as an EXV. An EXV controller 38 is coupled to control the EXV 24. In some embodiments, the EXV controller 38 includes programmable logic circuitry and memory for executing control algorithms and mapping tables used to control operation of the EXV 24. In some embodiments, the EXV controller 38 can be integrated as part of the HVAC unit controller 14. The EXV controller 38 is coupled to a pressure sensor 40 and a temperature sensor 42 to receive sensed pressure data and sensed temperature data, respectively, of the refrigerant output from the evaporator 12. The EXV controller 38 also is coupled to the compressor 18 to receive compressor signals 44, which indicate various characteristics/conditions of the compressor 18. The compressor signals 44 can be a signal indicating a start-up condition or a signal indicating a change in rps (revolutions per second) of the compressor 18. In some embodiments, the start-up condition signal is a binary value indicating whether or not the compressor is in a start-up mode of operation. The start-up condition indicates that the compressor has been turned on. In some embodiments, the change in rps signal is a binary value indicating whether or not the rps of the compressor has been changed. In other embodiments, the change in rps signal provides an actual rps value of the compressor. The EXV controller 38 also is coupled to an outdoor temperature sensor 46 to receive sensed outdoor temperature data. In some embodiments, the outdoor temperature sensor 46 is positioned to measure an outdoor ambient temperature. In other embodiments, the outdoor temperature sensor 46 is positioned external to the HVAC system 2 or positioned external to a room or building being conditioned by the HVAC system 2.

In some embodiments, the EXV controller 38 includes a processing control board that includes programmable logic and control circuitry for receiving and processing sensed data from a variety of different types of sensors and the compressor, applying programmed logic and stored control algorithms and mapping tables to determine control signaling for the EXV 24, and generating and transmitting such determined control signaling to the EXV 24. In some embodiments, the processing control board includes a microprocessor, a CPU (central processing unit), or other similar type processing circuitry and/or integrated circuit for executing the control algorithms and mapping tables used to operate and control the EXV 24. The control algorithms and mapping tables can be stored locally on the processing board or on a separate storage medium accessible by the processing circuitry. The mapping table defines controllable actions to be taken, such as the steps to be applied to the EXV 24, based on the various received sensed data and compressor signals.

The EXV controller 38 is configured to use the sensed pressure data, the sensed temperature data, the sensed outdoor temperature data, and/or the compressor signals 44 to determine and send appropriate control signals to the EXV 24. In some embodiments, the control signal sent to the EXV 24 indicates an amount of "step" for adjusting the EXV, e.g. step the EXV open or closed by the number of steps and direction (positive for open, negative for closed) indicated by the map, or that provides a step value at which the EXV is to be set.

In some embodiments, the EXV controller 38 implements PID (Proportional Integral Derivative) control for generating the control signals sent to the EXV 24. PID control is a known algorithm. PID control is a mechanism for manipulating the EXV 24 according to measured temperature and pressure (output from the evaporator) to bring the current superheat closer to the superheat set point. The PID control uses the measured temperature and pressure along with predefined gain values $K_P$, $K_I$, and $K_D$ to calculate an EXV step (EXV control signal) for step-wise opening or closing the EXV 24. The superheat set point is a predetermined constant value, typically set between 10 and 12 degrees for air conditioning applications. If the actual current superheat is greater than the superheat set point, then the energy consumption of the HVAC system increases resulting in reduced energy efficiency. In general, the higher the superheat, the lower the energy efficiency. However, the risk of damage to the HVAC system is inversely related to the efficiency, meaning that the higher the efficiency (with corresponding lower superheat set point) the greater the risk of damage. Therefore, a trade-off is made between energy efficiency and risk of HVAC system damage to determine a superheat set point. The superheat set point value is determined during a calibration of the HVAC system during production, and this predetermined superheat set point value is saved and used as a constant by the EXV controller during operation of the HVAC system.

Figures 3, 4:
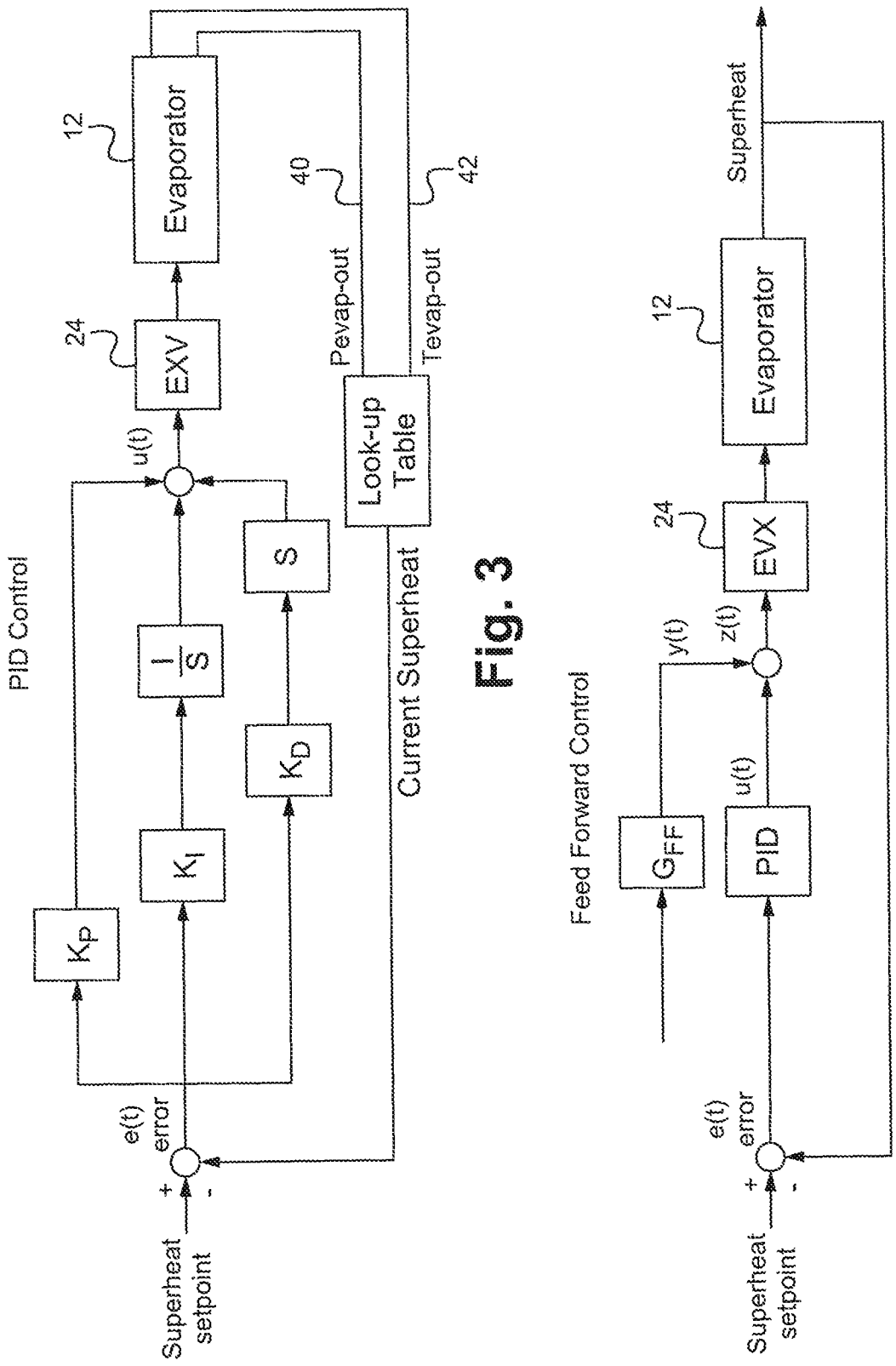
FIG. 3 illustrates a functional block diagram for a PID control algorithm according to some embodiments.
FIG. 4 illustrates a functional block diagram of an algorithm utilizing both PID control and feed-forward control according to some embodiments.

FIG. 3 illustrates a functional block diagram for a PID (Proportional Integral Derivative) control algorithm according to some embodiments. PID control automatically adjusts a control output based on the difference between the superheat set point and calculated current superheat. To implement PID control, the temperature and pressure of the refrigerant output from the evaporator is sensed (measured) and the sensed data is used to adjust (regulate) the EXV 24 according to the results of a PID control algorithm. The PID control algorithm continuously calculates an error value e(t) as the difference between the calculated current superheat and the superheat set point, and applies a correction based on proportional (P), integral (I), and derivative (D) terms to generate an EXV control signal u(t) that is sent to the EXV 24. In general, superheat is calculated as the difference between the measured temperature (output from the evaporator) and the current saturation temperature, where the current saturation temperature is calculated according to the measured pressure (output from the evaporator). In an exemplary application, the desired superheat is between 10 and 15 degrees. PID control attempts to minimize the error over time by adjustment of the control signal u(t), such as the opening of the EXV, to a new value determined by a weighted sum of the control terms P, I, and D. The distinguishing feature of PID control is the ability to use the three control terms P, I, and D to influence the PID control output u(t) to apply accurate and optimal control of the EXV 24. The proportional term P is proportional to the current value of the error value e(t). For example, if the error e(t) is large and positive, then the PID control output is proportionately large and positive, taking into account a proportional gain factor $K_P$. The proportional term P is calculated by multiplying the error value e(t) by the proportional gain factor $K_P$. Using proportional control alone results in an error between the superheat set point and the actual process value (calculated current superheat value) because it requires an error to generate the proportional response. If there is no error, there is no corrective response. The integral term I accounts for past values of the error value e(t) and integrates these past values over time, indicated in FIG. 3 as the box labeled 1/S. The result of the integration calculation is multiplied by an integral gain factor $K_I$. For example, if there is a residual error value e(t) after the application of proportional control, the integral term I seeks to eliminate the residual error by adding a control effect due to the historic cumulative value of the error. When the error is eliminated, the integral term I ceases to increase. This results in the proportional effect diminishing as the error decreases, but this is compensated for by the growing integral effect. The derivative term D is a best estimate of the future trend of the error value e(t), based on its current rate of change. The derivative term D is effectively seeking to reduce the effect of the error by exerting a control influence generated by the rate of error change. The more rapid the change, the greater the controlling or dampening effect. The derivative term D is calculated by taking the derivative of the error values e(t) over time, indicated in FIG. 3 as the box labeled S, and multiplying the result by a derivative gain factor $K_D$. The control variable u(t) is calculated as the sum of the proportional term P, the integral term I, and the derivative term D. The EXV controller 38 uses the value of the control variable u(t) to appropriately regulate the EXV 24.

PID control only utilizes measured temperature and pressure output from the evaporator, and as such this type of control is considered reactive, i.e. whatever changes in conditions are happening in the loop, the reaction to such condition changes is manifested at the output of the evaporator in the form of the temperature and pressure of the refrigerant, which is being measured and reacted to by adjusting the EXV 24. This is not proactive, i.e. anticipating the need to adjust the EXV 24 due to a change in conditions (load). In some embodiments, the EXV controller 38 also uses sensed compressor data, e.g. start-up state, change in rps, and sensed outdoor temperature, which provide indications of change in conditions, and as such can be used for proactive control. Such proactive control is referred to as feed-forward (FF) control. As applied to the HVAC system and corresponding EXV control described herein, feed-forward refers to sensed data related to a change in one or more operating characteristics (change in compressor state, e.g. start up or rps change) or external conditions (change in outside temperature) that will disturb the state of the HVAC system. Examples of such disturbances include, but are not limited to, load changes, compressor rps change, and compressor start-up. FF control provides a mechanism for reducing the effects of disturbances on the HVAC system. FF control enables the HVAC system to respond faster and smoother during a disturbance (e.g. compressor speed variations) and reduce the number of iterations that the EXV needs to adjust to achieve the desired superheat. Reducing the number of iterations saves time and energy consumption, and eventually increases the life of the EXV because of fewer opening/closing operations, which improves reliability of the component and the HVAC system. Feed-forward variables and corresponding sensed data can also include the speed and air flow changes of indoor and outdoor fans in the system if such changes are independent of compressor speed change. In the exemplary embodiments described below, compressor speed (rps) and indoor/outdoor fan speeds are interrelated, i.e. changes in compressor rps automatically change the indoor/outdoor fan speeds. It is understood that the description herein can be expanded to take into account other feed-forward variables. The feed-forward sensed data is provided to the EXV controller to determine anticipated changes of state (conditions) related to the sensed data and appropriate EXV operating parameters for maintaining a current superheat set point. In an HVAC system using only feed-forward control, the control variable adjustment, e.g. adjustment of the EXV, is not error-based. Instead it is based on knowledge about the process in the form of a mathematical model of the process (mapping), stored within and accessed by the EXV controller, and knowledge about, or measurements of, the process disturbances, e.g. the feed-forward sensed data. To mitigate the coupling between compressor speed and superheat, feed-forward control is used to reduce the effect of system disturbances, e.g. load change and/or compressor rps change.

A master control algorithm executed by the EXV controller 38 can selectively utilize both PID control and feed-forward control. FIG. 4 illustrates a functional block diagram of an algorithm utilizing both PID control and feed-forward control according to some embodiments. The PID control is implemented as in FIG. 3, generally represented by the box labeled "PID" in FIG. 4. The feed-forward control and corresponding feed-forward data are indicated generally by the box labeled "GFF". The PID control results u(t) and the feed-forward control results y(t) are applied to a mapping procedure, described in greater detail below, to generate a control signal z(t) that is provided to the EXV 24. Selective use of both PID control and feed-forward control enables the EXV controller 38 to more quickly regulate the EXV 24 to achieve the desired superheat as compared to only using PID control. This leads to improved efficiency (less energy consumption), improved lifetime of the EXV, and so on.

There are three modes of operation that can be identified. A first mode is a start-up mode, which refers to when the HVAC system is turned on. Turning on the HVAC system also corresponds to turning on the compressor, and as such the start-up mode also refers to when the compressor is turned on. A second mode is a rps change mode, which refers to a change in speed of the compressor (compressor motor). This is particularly applicable to multiple-speed compressors. A third mode is a load change mode, which refers to a change in the load. Load change (or "just load change") refers to the gradual/slow HVAC equipment load change which does not require a change in compressor speed (rps) to address. These situations are compensated for by the EXV opening and closing to provide more or less refrigerant to the system in order to match the equipment capacity with the building load. Changes in the building load are typically slow (gradual) and typically occur due to gradual outdoor conditions changes (e.g. ambient temperature and humidity increase or decrease which change the cooling or heating load in the building) and/or gradual indoor condition changes such as more latent heat inside the space (e.g. more people, cooking in the building, turn on electronic devices such as TV, computer, opening the external doors or windows, etc.). The load change mode, also referred to as "just load change" mode, only changes the position of EXV valve (more open or close) to adjust the equipment load. It does not change the compressor speed/rps. The rps change mode is activated when the HVAC system controller decides that the compressor rps needs to be changed to adjust the load. In this case a system control algorithm executed by the HVAC system controller decides that EXV opening/closing is not enough to match the equipment and building loads and the compressor needs to change the speed or rps in order to change refrigerant flow momentarily. Variable speed compressors typically have multiple different operating settings, e.g. settings 1-8, where each setting has a corresponding rps. The rps change associated with the rps change mode corresponds to change in rps due to a change in the compressor operating setting.

The master control algorithm used by the EXV controller 38 includes a plurality of separate sub-control algorithms. Each of the three modes of operation utilize a unique subset of the sub-control algorithms. The master control algorithm includes an initial series of branching decision points to determine the current mode of operation and to execute the select sub-control algorithms corresponding to the current mode of operation, while not executing the sub-control algorithms corresponding to the other two modes of operation. In this manner, the EXV controller 38 is enabled to more efficiently and quickly execute the master control algorithm by only executing those sub-control algorithms corresponding to the current mode of operation. The initial series of branching decision points are repeatedly evaluated to determine if there is a change in the current mode of operation, and if a change is determined, the sub-control algorithms corresponding to the newly determined mode of operation are executed instead of the sub-control algorithms corresponding to the previously determined mode of operation. The initial branching decision points can be repeated every 0.5 to 3 minutes, for example, after completion of each master control algorithm iteration. Such a time frame is subject to change or fin-tuning. Conceptually, the three modes can be considered parallel modes of operation and the corresponding sub-control algorithms associated with each mode can be considered parallel processes, or paths through the master control algorithm, where only one mode/process is being executed while the other two modes/processes are bypassed. In contrast, a master control algorithm configured as a series of processes would implement each of the sub-control algorithms sequentially, in-series, requiring each of the sub-control algorithms to be loaded into memory and executed in-series to determine their relevance (relevance based on current mode of operation versus the mode of sub-control algorithm) regardless of the actual current mode of operation. Configuring the master control algorithm with parallel processes improves the speed of EXV control and reduces complexity of the EXV controller 38. The master control algorithm with parallel processes provides an up-front mechanism for selecting which sub-control algorithms are to be executed based on a determined current mode of operation.

Additionally, or alternatively, to implementing parallel modes of operation, the master control algorithm selectively implements either PID control and/or feed-forward control for regulating the EXV 24. PID control of the EXV 24 is conceptually reactive (feedback) based on the sensed temperature and pressure output from the evaporator 12, and feed-forward control provides proactive control of the EXV 24 based on the sensed outdoor temperature and compressor characteristics. Use of feed-forward control along with PID control provides improved energy consumption of the HVAC system and increases the operational lifetime of the EXV by reducing the frequency of opening and closing of the EXV 24.

Figure 5:
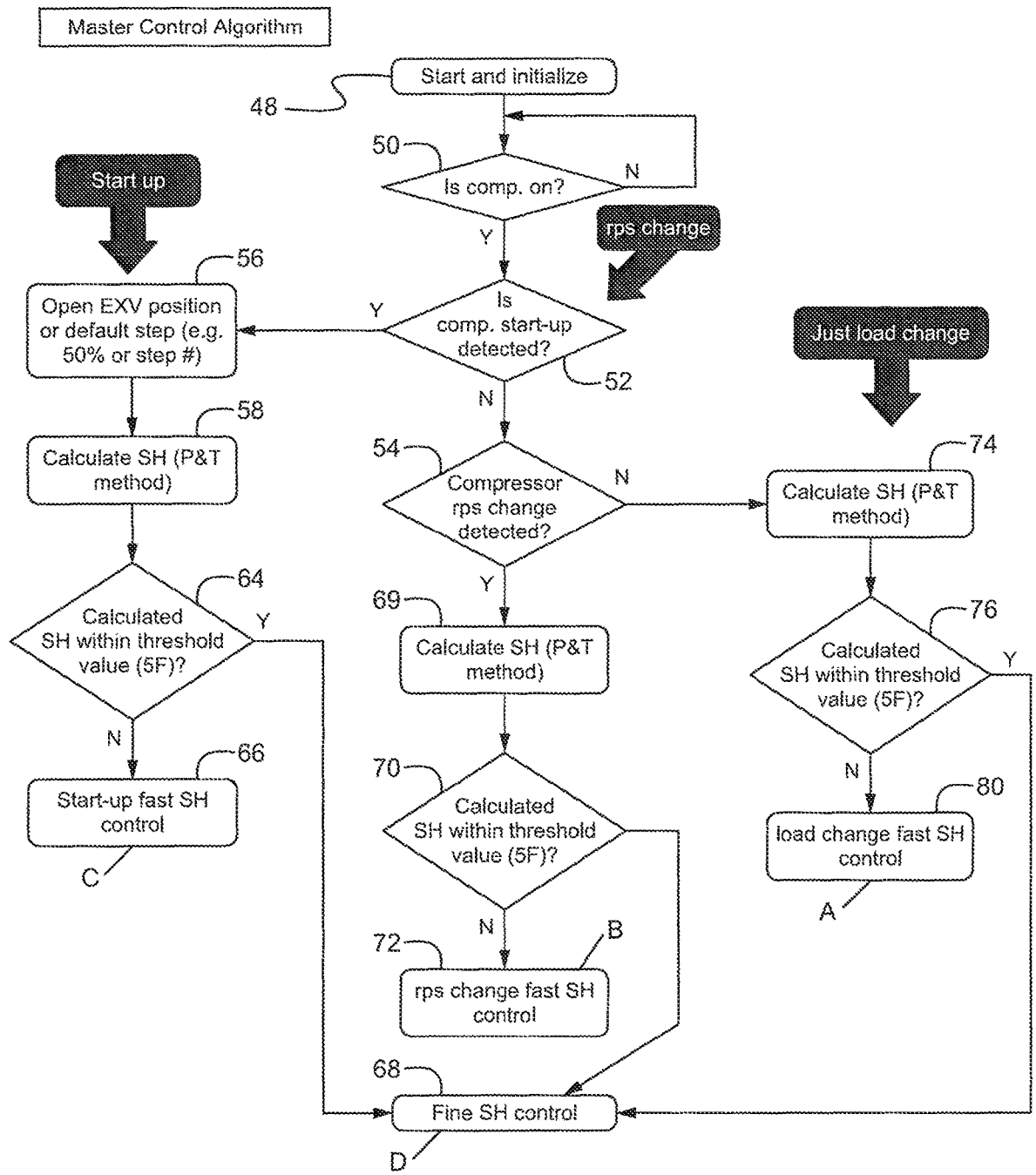
FIG. 5 illustrates a master control algorithm according to some embodiments.

FIG. 5 illustrates a master control algorithm according to some embodiments. At the step 48, the master control algorithm starts and is initialized. At the step 50, it is determined if the compressor is turned on. If the compressor is turned on, then the algorithm moves to the step 52. If the compressor is not turned on, then the algorithm continues to monitor if the compressor is turned on. At the step 52, it is determined if a compressor start-up condition is present. If the compressor start-up condition is not determined at the step 52, then the algorithm moves to the step 54. If the compressor start-up condition is determined at the step 52, then the algorithm moves to the step 56. Determination that the start-up condition is present corresponds to the start-up mode of operation, which begins at the step 56. At the step 56, the EXV is opened to a start-up position, which can be a default percentage, such as 50% open, or a default step position. The EXV can be step-wise opened and closed, and the EXV is controllable within a range of controllable steps. The default step position corresponds to a specific step within the range of steps. At the step 58, the current superheat is calculated using the sensed temperature and pressure of the refrigerant at the output of the evaporator 12. At the step 64, it is determined if a difference between the current superheat calculated at the step 58 and the superheat set point is within a predefined threshold value. In some embodiments, the superheat set point is set to a value between 6 and 16 degrees, and the predefined threshold value to which the start-up fast SH control algorithm adjusts the superheat is within 5 degrees of the superheat set point, for example the super heat set point is set at 10 degrees and the predefined threshold value is set to +/−5 degrees so that the absolute predefined superheat range is 5-15 degrees (+/−5 degrees of 10 degree superheat set point). It is understood that the superheat set point range can be different than 6 to 16 degrees, the superheat set point can be different than 10 degrees, and the predefined threshold value of the superheat for the start-up fast SH control algorithm can be larger or smaller than 5 degrees. If it is determined that the calculated current superheat is not within the predefined threshold value at the step 64, then the algorithm moves to the step 66 and the start-up fast SH control algorithm is executed. If it is determined that the calculated current superheat is within the predefined threshold value at the step 64, then the algorithm moves to the step 68. At the step 68, a fine SH control algorithm is executed. Steps 56, 58, 64, 66, and 68 correspond to the start-up mode of operation, and the start-up fast SH control algorithm 66 and the fine SH control algorithm 68 are sub-control algorithms associated with the start-up mode of operation.

At the step 54, it is determined if there is a change in the compressor rps. In some embodiments, the change in compressor rps corresponds to a change in compressor rps due to a change in the compressor operating setting. If it is determined at the step 54 that there is not a rps change, then the algorithm moves to step 74. If it is determined at the step 54 that there is a rps change, then the algorithm moves to step 69. At the step 69, the current superheat is calculated using the sensed temperature and pressure of the refrigerant at the output of the evaporator 12. At the step 70, the current superheat calculated at the step 69 is compared to the superheat set point, and it is determined if the calculated current superheat is within a predefined threshold value of the superheat set point in a manner similar to that at the step 64. It is understood that the predefined threshold value used at the step 70 can be different than the predefined threshold value used at the step 64. If it is determined that the calculated current superheat is not within the predefined threshold value at the step 70, then the algorithm moves to the step 72 and the rps change fast SH control algorithm is executed. If it is determined that the calculated current superheat is within the predefined threshold value at the step 70, then the algorithm moves to the step 68. Steps 69, 70, 72, and 68 correspond to the rps change mode of operation, and the rps change fast SH control algorithm 72 and the fine SH control algorithm 68 are sub-control algorithms associated with the rps change mode of operation.

At the step 74, the current superheat is calculated using the sensed temperature and pressure of the refrigerant at the output of the evaporator 12. At the step 76, the current superheat calculated at the step 74 is compared to the superheat set point, and it is determined if the calculated current superheat is within a predefined threshold value of the superheat set point in a manner similar to that at the step 64. It is understood that the predefined threshold value used at the step 76 can be different than the predefined threshold value used at the step 64. If it is determined that the calculated current superheat is not within the predefined threshold value at the step 76, then the algorithm moves to the step 80 and the load change fast SH control algorithm is executed. If it is determined at the step 76 that the calculated current superheat is within the predefined threshold value at the step 76, then the algorithm moves to the step 68 where the fine SH control algorithm is executed. Steps 74, 76, 80, and 68 correspond to the load change mode of operation, and the load change fast SH control algorithm 80 and the fine SH control algorithm 68 are sub-control algorithms associated with the load change mode of operation.

In the exemplary master control algorithm shown in FIG. 5, there are four separate sub-control algorithms: start-up fast SH (superheat) control algorithm 66, fine SH control algorithm 68, rps change fast SH control algorithm 72, and load change fast SH control algorithm 80. The term "fast" in the context of the sub-control algorithms 66, 72, 80 refers to a "coarse" level of control, in contrast to the "fine" level of control implemented in fine SH control algorithm 68. For example, if the superheat set point is 10 degrees, but the actual calculated superheat is 30 degrees, then the fast sub-control algorithms 66, 72, 80 each function to drop the superheat to within a few degrees, such as within 5 degrees, of the superheat set point. The fine SH control algorithm 68 then functions to drop the superheat by the few degrees to about the superheat set point, such as 10 degrees. In this manner, the fast sub-control algorithms function as coarse control mechanisms (coarse-tuning) and the fine sub-control algorithm functions as a fine control mechanism (fine-tuning).

Figure 6:
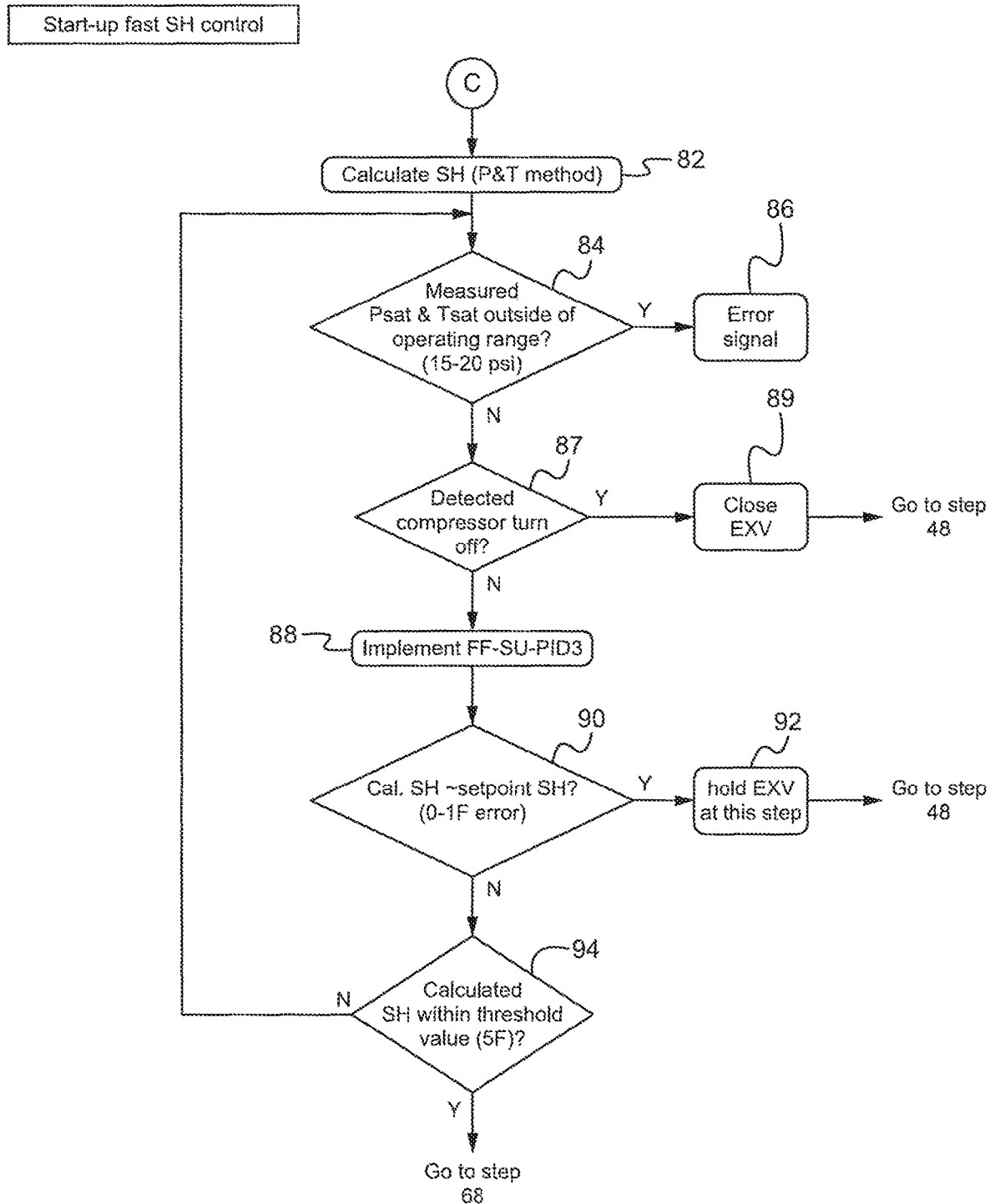
FIG. 6 illustrates the start-up fast SH control algorithm of FIG. 5 according to some embodiments.
Figure 7:
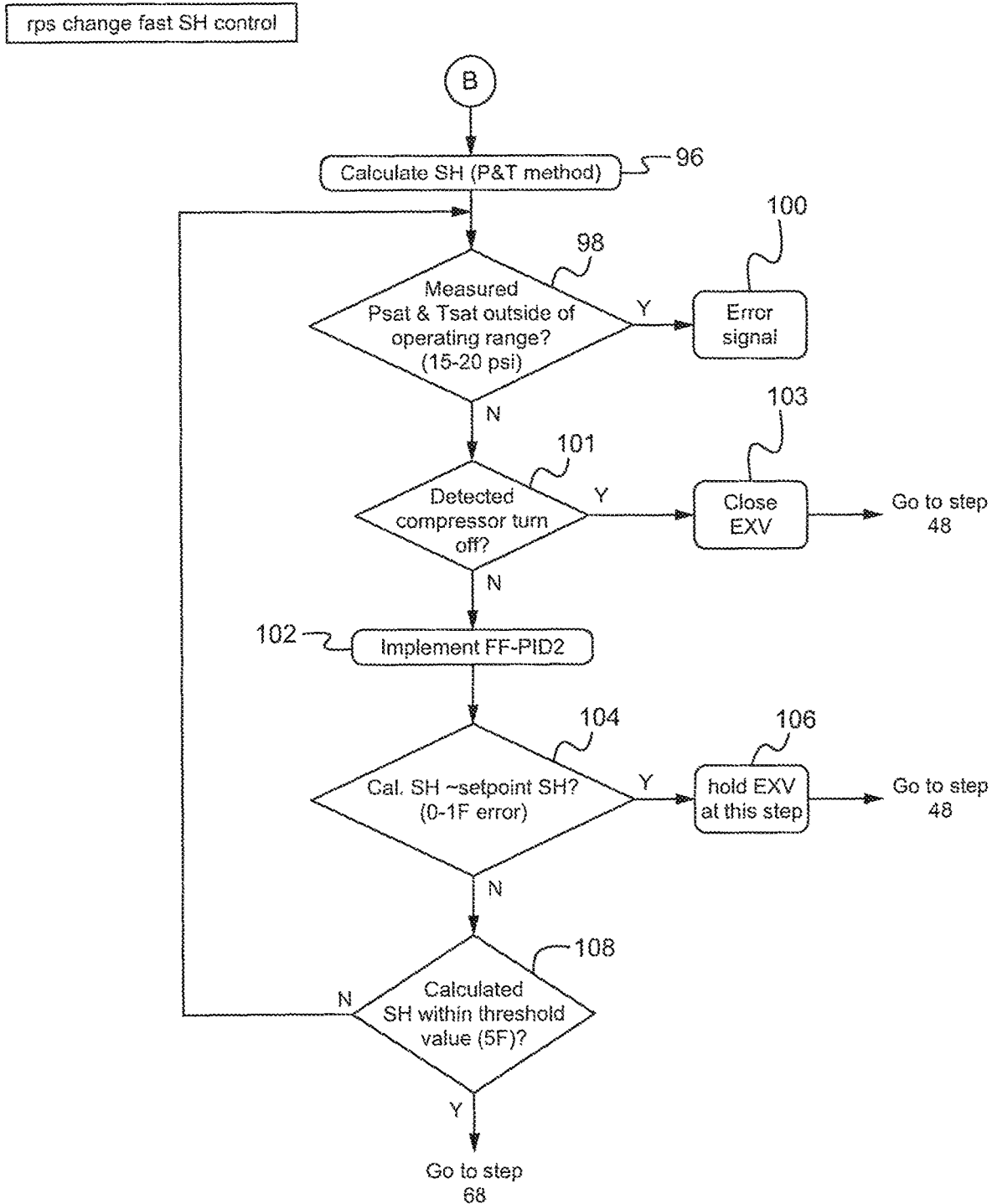
FIG. 7 illustrates the rps change fast SH control algorithm of FIG. 5 according to some embodiments.

FIG. 6 illustrates the start-up fast SH control algorithm of FIG. 5 according to some embodiments. At the step 82, the current superheat is calculated using the sensed temperature and pressure of the refrigerant at the output of the evaporator 12. At the step 84, it is determined if the measured temperature (Tsat) and pressure (Psat) at the output of the evaporator is below a normal lower operating threshold. In some embodiments, the normal lower operating threshold for the pressure is 15-20 psi and the normal lower operating range for the temperature is −26 F (corresponding to 15 psi) to −35 F (corresponding to 20 psi). If it is determined at the step 84 that either the temperature or pressure is below the normal lower operating threshold, then the algorithm moves to the step 86 where an error signal is generated. If it is determined at the step 84 that both the temperature and pressure are within the normal operating range, then the algorithm moves to the step 87. At the step 87, it is determined if the compressor has been turned off. If it is determined that the compressor has been turned off at the step 87, then at the step 89 the EXV is closed and the algorithm moves back to the step 48. If it is determined that the compressor has not been turned off at the step 87, then at the step 88 a start-up mode EXV step adjustment calculation is made. In some embodiments, both a PID control and feed-forward control are performed during this step. The feed-forward (FF) control uses a mapping and conversion procedure, which is different when used in the start-up mode verses the rps change mode. The FF control used in the start-up (SU) mode is designated by "FF-SU", to contrast the FF control used in the rps change mode, designated as simply "FF" (FIG. 7). The PID control is performed using the measured temperature and pressure output from the evaporator.

The PID control also uses the proportional gain factor $K_P$, the integral gain factor $K_I$, and the derivative gain factor $K_D$. The PID control implemented as part of the start-up fast SH control algorithm 66 uses gain factor values specifically determined for the start-up fast SH control algorithm. As such, the PID control used in step 88 is referred to as PID3 control, and the specific gain factor values used by PID3 control are referred to as the proportional gain factor $K_{P3}$, the integral gain factor $K_P$, and the derivative gain factor $K_P$. Similarly, PID control used in other sub-control algorithms, such as the rps change fast SH control algorithm 72, the load change fast SH control algorithm 80, and the fine SH control algorithm 68, also use gain factor values specifically determined for their respective sub-control algorithms. For example, the PID control used in the rps change fast SH control algorithm 72 (FIG. 7) is referred to as PID2 control, and the specific gain factor values used by PID2 control are referred to as the proportional gain factor $K_{P2}$, the integral gain factor $K_{I2}$, and the derivative gain factor $K_{P2}$. The PID control used in the load change fast SH control algorithm 80 (FIG. 8) is referred to as PID1 control, and the specific gain factor values used by PID1 control are referred to as the proportional gain factor $K_{P1}$, the integral gain factor $K_{I1}$, and the derivative gain factor $K_{P1}$. The PID control used in the fine SH control algorithm 68 (FIG. 9) includes two separate PID controls, referred to as PID4 control and PID5 control, where the specific gain factor values used by PID4 control are referred to as the proportional gain factor $K_{P4}$, the integral gain factor $K_{I4}$, and the derivative gain factor $K_{P4}$, and the specific gain factor values used by PID5 control are referred to as the proportional gain factor $K_{P5}$, the integral gain factor $K_{I5}$, and the derivative gain factor $K_{P5}$. The use of references PID1, PID2, PID3, PID4, and PID 5 in FIGS. 6-9 refers to different values of the gain factors $K_P$, $K_I$, and $K_D$ used in the PID control. The specific gain factor values are predetermined constants stored in a look-up table, for example, accessible by the master control algorithm. For example, the values of the gain factors $K_P$, $K_I$, and $K_D$ used by the sub-control algorithm for PID1 control are $K_{P1}$, $K_{I1}$, and $K_{D1}$, etc. The specific gain factor values are application specific and are typically different from one sub-control algorithm to the next. The specific gain factor values for each sub-control algorithm are different due to the different modes of operation associated with each sub-control algorithm. The specific gain factor values can be different, similar, or the same from one sub-control algorithm to the next due to the modes of operation, outdoor/indoor conditions, and the location of PID control within the master control algorithm. In addition, the specific gain factor values depend on the superheat set point and the time target for which the master control algorithm is configured to adjust to this superheat set point. In some embodiments, the specific gain factor values for each sub-control algorithm are determined during calibration of the HVAC system in a laboratory setting.

The FF control is performed using the measured outdoor temperature and compressor characteristics, e.g. start-up condition or rps change. In some embodiments, mapping and conversion procedure is performed using the results of the feed-forward control and the PID3 control to determine a corresponding start-up mode EXV step adjustment. The EXV 24 is adjusted according to the determined start-up mode EXV step adjustment. In some embodiments, initially the feed-forward control FF-SU is implemented using a working map corresponding to the regulating device (EXV). This map is the opening step of the EXV as a function of system operating conditions including, for example, outdoor temperature, compressor speed (rps), indoor fan speed (rpm), and outdoor fan speed (rpm). In some embodiments, the map is a look up table that provides a specific step count for the EXV corresponding to specific system operating condition values. Feed-forward mapping relates the HVAC system information, such as outdoor temperature and compressor rps, to a specific EXV step or position. At each operating condition combination, e.g. a specific outdoor temperature and specific compressor rps (or stage), the feed-forward map specifies a step (or open position) for the EXV to be opened by its stepper motor without yet implementing PID control and trial and error. This EXV open/closed position is not the final position, but it is relatively close to the final position. With further assistance from the associated PID control, e.g. FF-SU+PID3, the EXV step position is fine tuned to the final position much quicker than only implementing PID control. In this sense, the feed-forward control FF-SU functions as fast, or coarse, tuning and the PID3 control functions as fine-tuning. In general, feed-forward control adjusts the superheat as close as possible to the range of target with minimum EXV position/step change at the shortest amount of time. In some embodiments, implementation of the feed-forward control FF-SU may be sufficient for adjusting the superheat value to within a predetermined threshold value, such as determined at either the steps 90 or 94, in which case it may not be necessary to implement the PID3 control. In this case the PID3 control can be bypassed. In this manner, the PID3 control can be utilized as a back-up procedure in case the feed-forward control FF-SU alone does not adjust the superheat to within the predetermined range.

After the EXV step adjustment is determined and executed at the step 88, the current superheat is again calculated using the sensed temperature and pressure of the refrigerant at the output of the evaporator 12, and the newly calculated current superheat is compared to the superheat set point at the step 90. If it is determined at the step 90 that the current superheat is equal to or approximate to the superheat set point, such as equal to or less than 1 degree of the superheat set point, then it is determined that the EXV is accurately set and the algorithm moves to the step 92 where the EXV is held at the current step. It is understood that the "approximate" determination of how close the newly calculated current superheat is to the superheat set point can be greater or less than the 1 degree range described above. The start-up fast SH control algorithm ends at the step 92, and the master control algorithm restarts at the step 48 after a predefined time period. If it is determined at the step 90 that the current superheat is not equal to or approximate to the superheat set point, then it is determined at the step 94 if the newly calculated current superheat is within a predefined threshold value in a manner similar to that at the step 64

(FIG. 5). It is understood that the predefined threshold value used at the step 94 can be different than the predefined threshold value used at the step 64. If it is determined at the step 94 that the newly calculated current superheat is not within the predefined threshold value, then the algorithm moves back to the step 84. If it is determined at the step 94 that the newly calculated current superheat is within the predefined threshold value, then the algorithm moves to the step 68 where the fine SH control algorithm is executed.

FIG. 7 illustrates the rps change fast SH control algorithm of FIG. 5 according to some embodiments. At the step 96, the current superheat is calculated using the sensed temperature and pressure of the refrigerant at the output of the evaporator 12. At the step 98, it is determined if the measured temperature (Tsat) and pressure (Psat) at the output of the evaporator is outside of the normal operating range. If it is determined at the step 98 that either the temperature or pressure is outside the normal operating range, then the algorithm moves to the step 100 where an error signal is generated. If it is determined at the step 98 that both the temperature and pressure are within the normal operating range, then the algorithm moves to the step 101. At the step 101, it is determined if the compressor has been turned off. If it is determined that the compressor has been turned off at the step 101, then at the step 103 the EXV is closed and the algorithm moves back to the step 48. If it is determined that the compressor has not been turned off at the step 101, then at the step 102 a rps change mode EXV step adjustment calculation is made. In some embodiments, both a PID2 control and FF control are performed during this step. The PID2 control is performed using the measured temperature and pressure output from the evaporator, as well as using the proportional gain factor $K_{P2}$, the integral gain factor $K_{I2}$, and the derivative gain factor $K_{D2}$.

The feed-forward control is performed using the measured outdoor temperature and compressor characteristics, e.g. start-up condition or rps change. In some embodiments, mapping and conversion procedure is performed using the results of the PID2 control and feed-forward control to determine a corresponding rps change mode EXV step adjustment. The EXV 24 is adjusted according to the determined rps change mode EXV step adjustment. After the EXV step adjustment is determined and executed at the step 102, the current superheat is again calculated using the sensed temperature and pressure of the refrigerant at the output of the evaporator 12, and the newly calculated current superheat is compared to the superheat set point at the step 104. If it is determined at the step 104 that the current superheat is equal to or approximate to the superheat set point, such as equal to or less than 1 degree of the superheat set point, then it is determined that the EXV is accurately set and the algorithm moves to the step 106 where the EXV is held at the current step. It is understood that the "approximate" determination of how close the newly calculated current superheat is to the superheat set point can be greater or less than the 1 degree range described above. The rps change fast SH control algorithm ends at the step 106, and the master control algorithm restarts at the step 48 after a predefined time period. If it is determined at the step 104 that the current superheat is not equal to or approximate to the superheat set point, then it is determined at the step 108 if the newly calculated current superheat is within a predefined threshold value in a manner similar to that at the step 64 (FIG. 5). It is understood that the predefined threshold value used at the step 104 can be different than the predefined threshold value used at the step 64. If it is determined at the step 108 that the newly calculated current superheat is not within the predefined threshold value, then the algorithm moves back to the step 98. If it is determined at the step 108 that the newly calculated current superheat is within the predefined threshold value, then the algorithm moves to the step 68 where the fine SH control algorithm is executed.

Figure 8:
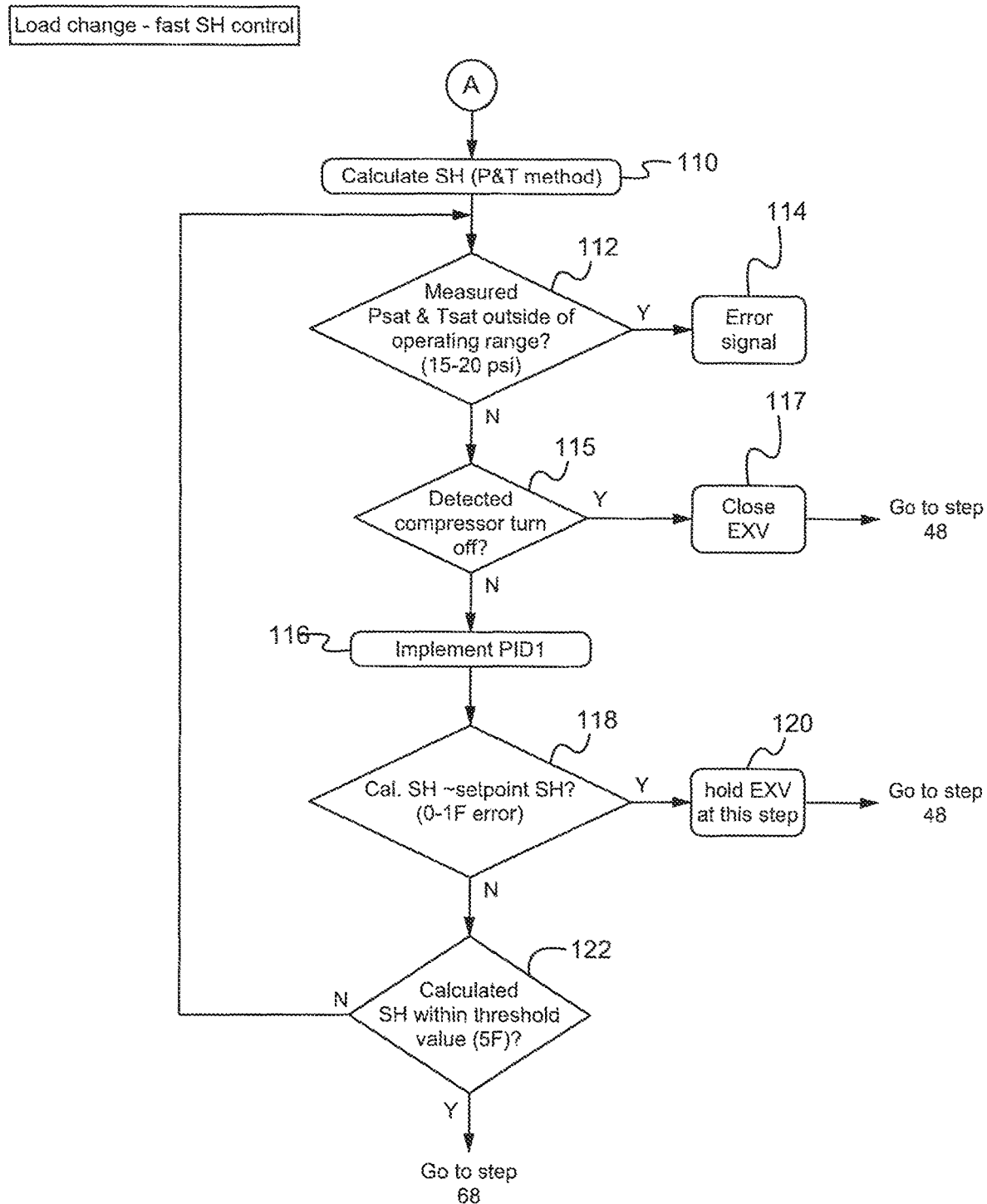
FIG. 8 illustrates the load change fast SH control algorithm of FIG. 5 according to some embodiments.

Feed-forward control is generally used to inform the master control algorithm ahead of time when there are abrupt refrigerant condition changes in the HVAC system (which is called disturbance into the system) and the EXV has not yet been adjusted to compensate for such condition changes. These conditions include compressor start up (start-up mode) and compressor speed change (rps change mode). In the case of "just load change", there is no disturbance and there is only gradual changing of the system load with gradual outdoor (or maybe indoor) temperature changes. In these cases, there is no abrupt refrigerant flow change in the system and there is no information to "feed forward" to the master control algorithm and EXV controller regarding the status of refrigerant flow. Therefore, the EXV can gradually open or close its position with a simple PID control to keep the current superheat close to the superheat set point. FIG. 8 illustrates the load change fast SH control algorithm of FIG. 5 according to some embodiments. At the step 110, the current superheat is calculated using the sensed temperature and pressure of the refrigerant at the output of the evaporator 12. At the step 112, it is determined if the measured temperature (Tsat) and pressure (Psat) at the output of the evaporator is outside of the normal operating range. If it is determined at the step 112 that either the temperature or pressure is outside the normal operating range, then the algorithm moves to the step 114 where an error signal is generated. If it is determined at the step 112 that both the temperature and pressure are within the normal operating range, then the algorithm moves to the step 115. At the step 115, it is determined if the compressor has been turned off. If it is determined that the compressor has been turned off at the step 115, then at the step 117 the EXV is closed and the algorithm moves back to the step 48. If it is determined that the compressor has not been turned off at the step 115, then at the step 116 a load change mode EXV step adjustment calculation is made. In some embodiments, a PID1 control is performed during this step. The PID1 control is performed using the measured temperature and pressure output from the evaporator, as well as using the proportional gain factor $K_{P1}$, the integral gain factor $K_{I1}$, and the derivative gain factor $K_{D1}$.

Execution of the PID1 control results in a corresponding load change mode EXV step adjustment. The EXV 24 is adjusted according to the determined load change mode EXV step adjustment. After the load change mode EXV step adjustment is determined and executed at the step 116, the current superheat is again calculated using the sensed temperature and pressure of the refrigerant at the output of the evaporator 12, and the newly calculated current superheat is compared to the superheat set point at the step 118. If it is determined at the step 118 that the current superheat is equal to or approximate to the superheat set point, such as equal to or less than 1 degree of the superheat set point, then it is determined that the EXV is accurately set and the algorithm moves to the step 120 where the EXV is held at the current step. It is understood that the "approximate" determination of how close the newly calculated current superheat is to the superheat set point can be greater or less than the 1 degree range described above. The load change fast SH control algorithm ends at the step 120, and the master control algorithm restarts at the step 48 after a predefined time period. If it is determined at the step 118 that the current superheat is not equal to or approximate to the superheat set point, then it is determined at the step 122 if the newly calculated current superheat is within a predefined threshold value in a manner similar to that at the step 64 (FIG. 5). It is understood that the predefined threshold value used at the step 122 can be different than the predefined threshold value used at the step 64. If it is determined at the step 122 that the newly calculated current superheat is not within the predefined threshold value, then the algorithm moves back to the step 112. If it is determined at the step 122 that the newly calculated current superheat is within the predefined threshold value, then the algorithm moves to the step 68 where the fine SH control algorithm is executed.

Figure 9:
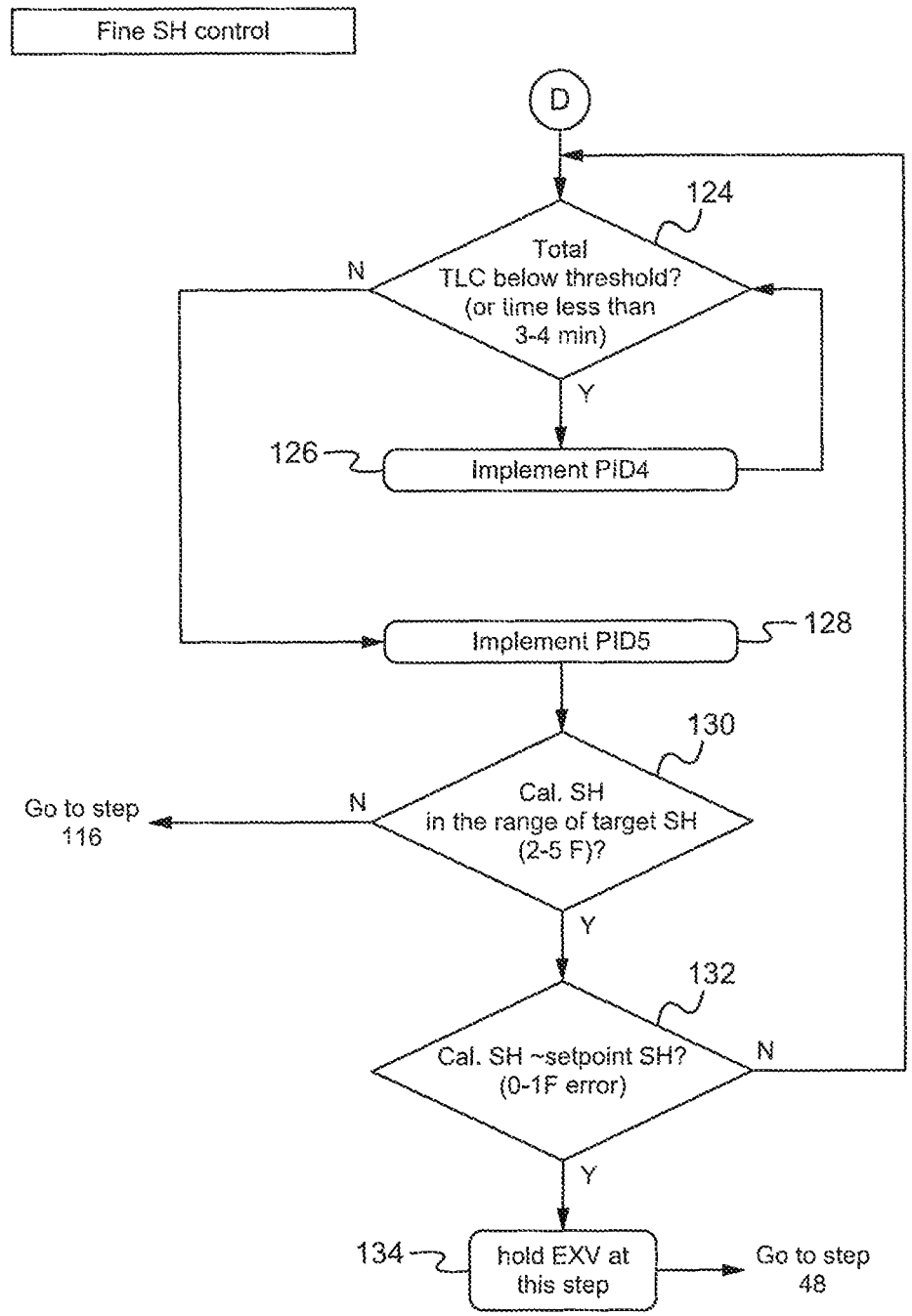
FIG. 9 illustrates the fine SH control algorithm of FIG. 5 according to some embodiments.

FIG. 9 illustrates the fine SH control algorithm of FIG. 5 according to some embodiments. In some embodiments, the fine SH control algorithm uses only PID control. In some embodiments, there are two PID control steps in the fine SH control algorithm, namely PID4 control and PID 5 control. PID4 control is the main loop PID in the fine-tuning procedure performed by the fine SH control algorithm, which is subject to a limited steps or time. In an exemplary procedure, the fine SH control algorithm is limited to 3-4 minutes. It is understood that the fine SH control algorithm can be configured to run for more, or less, than 3-4 minutes. PID5 control is a back-up control algorithm used to make sure that with an aggressive gain set (gain factor values), the fine SH control algorithm can lower the superheat to within the set target range, e.g. within 1 degree of the superheat set point, without sending the master control algorithm back to a previous fast-tuning stage, such as sub-control algorithms 88, 102, 116. If after implementation of the PID5 control the superheat is not within the set target range, then the algorithm returns back to a previous fast-tuning stage. In some embodiments, the fine SH control algorithm is implemented with only a single PID control, such as PID4 control.

The fine SH control algorithm is used to adjust the current superheat to be equal to or nearly equally to the superheat set point, i.e. within the set target range. At the step 124, a total TLC is compared to a predefined TLC threshold value. The total TLC is the time or number of iterations that the algorithm loop is actually executed. Limiting the execution time or number or iterations to a finite amount prevents the algorithm from continuing indefinitely. It is understood that similar time or iteration constraints can be implemented within the other sub-control algorithms. If the total TLC is below the TLC threshold value, then the algorithm moves to the step 126. If the total TLC is equal to or greater than the threshold value, then the algorithm moves to the step 128. At the step 126, a first fine-tuned EXV step adjustment calculation is made. In some embodiments, a PID4 control is performed during this step. The PID4 control is performed using the measured temperature and pressure output from the evaporator, as well as using the proportional gain factor $K_{P4}$, the integral gain factor $K_{I4}$, and the derivative gain factor $K_{P4}$. After the first fine-tuned EXV step adjustment is determined and executed at the step 126, the algorithm moves back to the step 124. The EXV 24 is adjusted according to the determined first fine-tuned EXV step adjustment.

At the step 128, an optional second fine-tuned EXV step adjustment calculation is made. In some embodiments, a PID5 control is performed during this step. The PID5 control is performed using the measured temperature and pressure output from the evaporator, as well as using the proportional gain factor $K_{P5}$, the integral gain factor $K_{I5}$, and the derivative gain factor $K_{P5}$. After the second fine-tuned EXV step adjustment is determined and executed at the step 128, the algorithm moves to the step 130. The EXV 24 is adjusted according to the determined second fine-tuned EXV step adjustment.

After the second fine-tuned EXV step adjustment is determined and executed at the step 128, the current superheat is again calculated using the sensed temperature and pressure of the refrigerant at the output of the evaporator 12, and the newly calculated current superheat is compared to the superheat set point at the step 130 to determine if a difference between the newly calculated current superheat and the superheat set point is within a predefined threshold value in a manner similar to that described in step 64 (FIG. 5). In some embodiments, this predefined threshold value is 5 degrees. It is understood that the predefined threshold value can be larger or smaller than 5 degrees. If it is determined at the step 130 that the newly calculated current superheat is not within the predefined threshold value, then the algorithm moves back to the step 116 (FIG. 8) and a load change mode EXV step adjustment is again calculated and executed. The algorithm moves to the sub-control algorithm 116 instead of to the other sub-control algorithms 88 or 102 because once the master control algorithm reaches the fine SH control algorithm 68 it is assumed that there are no longer disturbances related to the start-up mode or the rps change mode. As such, the sub-control algorithm 88 related to the load change mode suffices for adjusting the superheat to within the acceptable range of the superheat set point. If it is determined at the step 130 that the newly calculated current superheat is within the predefined threshold value, then the algorithm moves to the step 132. At the step 132, the current superheat is compared to the superheat set point. If it is determined at the step 132 that the current superheat is equal to or approximate to the superheat set point, such as equal to or less than 1 degree of the superheat set point, then it is determined that the EXV is accurately set and the algorithm moves to the step 134 where the EXV is held at the current step. It is understood that the "approximate" determination of how close the newly calculated current superheat is to the superheat set point can be greater or less than the 1 degree range described above. The fine SH control algorithm ends at the step 134, and the master control algorithm restarts at the step 48 after a predefined time period. If it is determined at the step 132 that the current superheat is not equal to or approximate to the superheat set point, then the algorithm moves back to the step 124.

In some embodiments, a primary function of the FF control is to provide adjustments to the EXV in response to disturbances in the HVAC system. FF control makes EXV adjustments related to system disturbances, e.g. compressor speed change, more efficiently (faster) than PI control. In some embodiments, this disturbance handling by FF control enables the HVAC system to respond faster by utilizing look up tables (mapping). In this sense, the FF control provides coarse-tuning. In some embodiments, PID control provides fine-tuning through proper gain factor values. However, the gain factor values used by PID control can be set for either fine-tuning or coarse tuning. For example, different gain factor values for PID1 control versus PID4 control or PID5 control makes the tuning performed by PID1 control more coarse.

In the embodiments described above, the sensed outdoor temperature and compressor characteristics are implemented as part of sub-control algorithms 66 and 72 that utilize feed-forward control. These fast (coarse-tuning) sub-control algorithms 66, 72 utilize the sensed pressure and temperature values for PID control and sensed outdoor temperature and compressor characteristics for feed-forward control, along with a sub-algorithm specific map that provides an amount of "step" for adjusting the EXV 24, e.g. step the EXV open or closed by the step and direction (positive for open, negative for closed) indicated by the map, or that provides a step value at which the EXV is to be set. Essentially, the sensed data (both for PID control and feed-forward control) is used by the EXV controller 38 to determine the EXV step (amount that the EXV is open) to be moved to and eventually held at once the system reaches an equilibrium state based on the measured conditions. It is understood that alternative embodiments are also contemplated. In other embodiments, only PID control can be used in each of the sub-control algorithms. In such embodiments, the sub-control algorithms 66 and 72 do not utilize feed-forward control. The gain factors used by the PID control in these modified sub-control algorithms 66, 72 use different values then the sub-control algorithms 66,72 that use both feed-forward control and PID control. The mapping functions used in the sub-control algorithms 66, 72 to determine the appropriate control signal for the EXV 24 are also different when using only PID control. In still other embodiments, the sub-control algorithms 66, 72 are alternatively modified so as to only implement feed-forward control. In such embodiments, the sub-control algorithms 66 and 72 do not utilize PID control. The mapping functions used in the sub-control algorithms 66, 72 to determine the appropriate control signal for the EXV 24 are also different when using only feed-forward control.

The present application has been described in terms of specific embodiments incorporating details to facilitate the understanding of the principles of construction and operation of the EXV control system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A heating, ventilation, and air condition (HVAC) system, comprising:
    a refrigerant loop including a refrigerant flowing within;
    a compressor coupled to the refrigerant loop;
    an evaporator coupled to the refrigerant loop;
    an electronic expansion valve coupled to the refrigerant loop to regulate a mass flow of the refrigerant into the evaporator; and
    a controller coupled to the compressor and the electronic expansion valve, wherein the controller is configured to receive data signals corresponding to one or more compressor characteristics, wherein the controller includes and is configured to execute a master control algorithm to generate control signals for controlling the electronic expansion valve, wherein the master control algorithm comprises a plurality of sub-control algorithms and an up-front evaluation algorithm, each of the plurality of sub-control algorithms is configured to determine a step adjustment of the electronic control valve, and wherein the master control algorithm executes the up-front evaluation algorithm to determine a current operating mode according to the received compressor characteristics and then selectively executes a subset of the plurality of sub-control algorithms depending on the determined current operating mode.

2. The HVAC system of claim 1 further comprising an external temperature sensor coupled to the controller, and wherein the external temperature sensor is configured to sense a temperature external to the HVAC system.

3. The HVAC system of claim 2 wherein the controller is further configured to perform a feed-forward control by mapping the measured compressor characteristics and the sensed external temperature to a corresponding open position of the electronic expansion valve.

4. The HVAC system of claim 3 wherein the controller is further configured to receive data signals corresponding to a pressure value at an output of the evaporator and a temperature value at the output of the evaporator.

5. The HVAC system of claim 4 wherein the controller is further configured to perform a PID (Proportional Integral Derivative) control using the received pressure value and the received temperature value to adjust the open position of the electronic expansion valve.

6. The HVAC system of claim 1 wherein the master control algorithm is configured to selectively execute the plurality of sub-control algorithms depending on the determined current operating mode while bypassing remaining sub-control algorithms corresponding to non-determined current modes of operation.

7. The HVAC system of claim 1 wherein the current operating mode is one of a start-up mode, a compressor rps change mode, and a load change mode.

8. The HVAC system of claim 7 wherein the up-front evaluation algorithm is configured to determine if the compressor is on, and then determine if the compressor is at start-up, which corresponds to the start-up mode, and then determine if there is a compressor rps change, which corresponds to the compressor rps change mode, and if the compressor is on but neither the compressor is in start-up mode nor is there compressor rps change mode then it is determined that the current operating mode is the load change mode.

9. A heating, ventilation, and air condition (HVAC) system, comprising:
    a refrigerant loop including a refrigerant flowing within;
    a compressor coupled to the refrigerant loop;
    an evaporator coupled to the refrigerant loop;
    an electronic expansion valve coupled to the refrigerant loop to regulate a mass flow of the refrigerant into the evaporator; and
    a controller coupled to the compressor and the electronic expansion valve, wherein the controller is configured to receive data signals corresponding to one or more compressor characteristics, wherein the controller includes and is configured to execute a master control algorithm to generate control signals for controlling the electronic expansion valve, wherein the master control algorithm includes a feed-forward sub-control algorithm that generates a step adjustment of the electronic control valve based on the one or more compressor characteristics to proactively adjust the electronic control valve, and wherein the master control algorithm comprises a plurality of sub-control algorithms, the plurality of sub-control algorithms comprising the feed-forward sub-control algorithm.

10. The HVAC system of claim 9 wherein the HVAC system further comprises a temperature sensor for sensing an external temperature, and the data signals received by the controller further include an external temperature value.

11. The HVAC system of claim 10 wherein the feed-forward sub-control algorithm generates the step adjustment based on the one or more compressor characteristics and the external temperature value.

12. The HVAC system of claim 9 wherein the master control algorithm is configured to selectively execute a subset of the plurality of sub-control algorithms depending on a determined current operating mode, and wherein the current operating mode is determined according to the compressor characteristics.

13. The HVAC system of claim 1 wherein the current operating mode is one of a start-up mode, a compressor rps change mode, and a load change mode.

14. The HVAC system of claim 13 wherein the subset of the plurality of sub-control algorithms corresponding to the start-up mode includes a first feed-forward control algorithm, a first PID (Proportional Integral Derivative) control algorithm, and a second PID control algorithm.

15. The HVAC system of claim 14 wherein the master control algorithm is configured to execute the first feed-forward control algorithm to provide a coarse-tuned first electronic expansion valve step adjustment, then to execute the first PID control algorithm to provide a fine-tuned second electronic expansion valve step adjustment, and then to execute the second PID control algorithm to provide a fine-tuned third electronic expansion valve step adjustment.

16. The HVAC system of claim 15 wherein the first PID control algorithm applies first gain factor values and the second PID control algorithm applies second gain factor values different from the first gain factor values.

17. The HVAC system of claim 14 wherein the subset of the plurality of sub-control algorithms corresponding to the compressor rps change mode includes a second feed-forward control algorithm, a third PID control algorithm, and the second PID control algorithm.

18. The HVAC system of claim 17 wherein the master control algorithm is configured to execute the second feed-forward control algorithm to provide a coarse-tuned first electronic expansion valve step adjustment, then to execute the third PID control algorithm to provide a fine-tuned second electronic expansion valve step adjustment, and then to execute the second PID control algorithm to provide a fine-tuned third electronic expansion valve step adjustment.

19. The HVAC system of claim 18 wherein the second PID control algorithm applies second gain factor values and the third PID control algorithm applies third gain factor values different from the second gain factor values.

20. The HVAC system of claim 17 wherein the subset of the plurality of sub-control algorithms corresponding to the load change mode includes a fourth PID control algorithm and the second PID control algorithm.

21. The HVAC system of claim 20 wherein the master control algorithm is configured to execute the fourth PID control algorithm to provide a fine-tuned first electronic expansion valve step adjustment and then to execute the second PID control algorithm to provide a fine-tuned second electronic expansion valve step adjustment.

22. The HVAC system of claim 9 wherein the data signals received by the controller further include a pressure value at an output of the evaporator and a temperature value at the output of the evaporator.

23. The HVAC system of claim 22 wherein the controller is further configured to execute a PID control algorithm using the received pressure value and the received temperature value to adjust the electronic expansion valve.

24. The HVAC system of claim 23 wherein the master control algorithm is configured to first execute the feed-forward control algorithm followed by the PID control algorithm.

25. A heating, ventilation, and air condition (HVAC) system, comprising:
a refrigerant loop including a refrigerant flowing within;
a compressor coupled to the refrigerant loop;
an evaporator coupled to the refrigerant loop;
an electronic expansion valve coupled to the refrigerant loop to regulate a mass flow of the refrigerant into the evaporator; and
a controller coupled to the compressor and the electronic expansion valve, wherein the controller is configured to receive data signals corresponding to one or more compressor characteristics, wherein the data signals further include a pressure value at an output of the evaporator and a temperature value at the output of the evaporator, wherein the controller includes and is configured to execute a master control algorithm to generate control signals for controlling the electronic expansion valve, wherein the controller is further configured to execute a PID control algorithm using the pressure value and the temperature value to adjust the electronic expansion valve, wherein the master control algorithm includes a feed-forward sub-control algorithm that generates a step adjustment of the electronic control valve based on the one or more compressor characteristics to proactively adjust the electronic control valve, and wherein the master control algorithm is configured to first execute the feed-forward control algorithm followed by the PID control algorithm.

* * * * *